United States Patent [19]
Singer et al.

[11] Patent Number: 5,957,556
[45] Date of Patent: Sep. 28, 1999

[54] CABLE MANAGEMENT SYSTEM FOR A COMPUTER

[75] Inventors: Richard Singer, Menlo Park; Johnny Huang, San Francisco, both of Calif.

[73] Assignee: Silicon Graphics, Inc., Mountain Viewq, Calif.

[21] Appl. No.: 08/717,988

[22] Filed: Sep. 23, 1996

[51] Int. Cl.⁶ .................................................. A47B 81/00
[52] U.S. Cl. ................................... 312/223.6; 108/50.02; 211/26
[58] Field of Search ............................. 312/223.2, 223.6, 312/257.1, 265.1, 198, 223.1; 108/50.02; 211/26, 184, 189, 191; 361/724, 730; 439/930, 948, 497, 499

[56] References Cited

U.S. PATENT DOCUMENTS

| | | | |
|---|---|---|---|
| 2,531,110 | 11/1950 | Cisler | 312/223.6 X |
| 4,442,476 | 4/1984 | Lenderking et al. | 361/395 |
| 4,535,703 | 8/1985 | Henriott et al. | 108/50.02 |
| 4,892,489 | 1/1990 | Hirai | 439/497 |
| 5,027,257 | 6/1991 | Lockwood et al. | 361/428 |
| 5,142,442 | 8/1992 | Daniels et al. | 361/384 |
| 5,154,126 | 10/1992 | Newhouse et al. | 108/50.02 |
| 5,275,494 | 1/1994 | Petracca et al. | 400/83 |
| 5,277,131 | 1/1994 | Fortsch | 108/50.02 |
| 5,568,362 | 10/1996 | Hansson | 312/223.6 X |
| 5,574,251 | 11/1996 | Sevier | 312/223.6 |
| 5,586,012 | 12/1996 | Lerman | 211/26 X |
| 5,673,632 | 10/1997 | Sykes | 108/50.02 X |
| 5,690,403 | 11/1997 | Ellison et al. | 108/50.02 |
| 5,788,087 | 8/1998 | Orlando | 211/26 |
| 5,803,770 | 9/1998 | Swendson et al. | 439/676 |

*Primary Examiner*—Jose V. Chen
*Assistant Examiner*—James O. Hansen
*Attorney, Agent, or Firm*—Schwegman, Lundberg, Woessner & Kluth PA

[57] ABSTRACT

A computer system includes seveal computing areas which are connected to one another by a number of cables. The cables are necessary to carry information from one computing area to another computing area. The cables can be thought of as the information highway between computing areas. The computer system has a first housing which has a frame. The frame includes an elongated hollow corner post that has an opening along the length of the corner post. The hollow portion of the corner post is used as a cable run.

The corner post further comprising an exterior surface having a key way therein. A number of cable guides, each having a key that fits within the key way of said elongated corner post, is attached to the corner post. Each cable guide has a two ends. One of said ends is positioned near the opening in the corner post and the other end of said cable guide is positioned near a computing area when the cable guide is positioned within the key way. A cable for interconnecting computing areas within the first housing passes over a cable guide, through the opening in the corner post, into the hollow portion of the corner post, down or up the corner post and out of the opening in the corner post and over another cable guide.

17 Claims, 14 Drawing Sheets

CABLE MANAGEMENT SYSTEM FOR A COMPUTER

FIELD OF THE INVENTION

The present invention relates to the field of computers. More particularly, this invention relates to an apparatus for managing the cables necessary to carry commands and data between separate units of a computer system.

BACKGROUND OF THE INVENTION

In many smaller computer systems, cable management is nonexistent. Most smaller computer systems merely have a nest of jumbled cables in back of the computer system. Larger computer systems may have cable management. The standard solution for cable bend radius management for a larger computer system includes a flexible, accordian pleat conduit which surrounds one or more cables between the connectors of the cable or cables. The conduit has several disadvantages. The conduit adds 50% to the diameter of the cable. The conduit also adds significant stiffness to the cable or cables. The added diameter and stiffness adds to the complexity of cable managment. In addition, the increased diameter of the cables requires increased space. As large computer systems become more I/O intensive there will be a vast need to lessen cable space.

Reusable cable clips and nylon cable ties are used to fasten cables. Reusable cable clips generally hold one large diameter cable. Nylon cable ties are used to fasten or bundle several cables. The nylon cable ties are not reusable so if access to one cable in the bundle is needed, all the cable ties associated with the particular bundle have to be removed and replaced. This makes servicing a computer system more difficult than it has to be since the access to cables is difficult and the cable ties generally have to abe replaced. Not only does the proper cable have to be located, but with some cable the accordian type conduit surrounding the cable must also be removed. Time is required to sort out the cables and remove conduit as well as remove and replace cable ties. Also, the more connections the service person has to jar during a service call, the higher the probability of a misrepair or of creating another problem. In addition, current cable management systems are not uniform. Each cable managment system is a custom job and will more than likely be different on the same model computer system cabled by two different installers. In other words, the effectiveness of a particular custom cable management job depends heavily on the skill of the installer.

Another aspect of cable management deals with the location and number of the cables in a typical computer system. A typical configuration for a computer is a large backplane into which a one or more processor boards plug into and out of. For such a typical configuration, the cables have always been housed in the rear of the housing since the back plane is where the input/output cables have entered or exited the computer housing. The main bus has also been located on the back plane. Certain computer systems are now becoming very input/output intensive. In other words, certain computer applications require a large number of input and output cables in and out of the computer. The result is that the backside of the computer is becoming quite crowded with various cables. Applications of computer systems which are input/output intensive include use of a large computer as a server and attaching a large number of smaller personal computers or computer terminals. Another input/output intensive application includes using a large computer as a video server.

Problems with poor cable management include uncontrolled bending of the cables which increases the chances of premature breakdown of insulation on cables and lessens the life and reliability of the electrical connections. This problem is more prevalent when a computer system is scaled upward or grows and additional housings are added to the computer system. Additional problems may arise if the cables are poorly positioned. Cables located in front of fans or air intakes or air outputs hamper cooling of the components inside the computer housing. If improperly cooled, microprocessors and other chips integral to the computer systme may prematurely fail.

There is a great need in the computer industry for a better cable managment system that does not waste valuable space, eliminates the use of one time cable ties and provides more uniform cable management for similar models of a computer. In addition, there is a great need for a cable management system that manages the cables in an area other than the back of the housing.

SUMMARY OF THE INVENTION

A computer system includes seveal computing areas which are connected to one another by a number of cables. The cables are necessary to carry information from one computing area to another computing area. The cables can be thought of as the information highway between computing areas. The computer system has a first housing which has a frame. The frame includes an elongated hollow corner post that has an opening along the length of the corner post. The hollow portion of the corner post is used as a cable run.

The corner post further comprising an exterior surface having a key way therein. A number of cable guides, each having a key that fits within the key way of said elongated corner post, is attached to the corner post. Each cable guide has a two ends. One of said ends is positioned near the opening in the corner post and the other end of said cable guide is positioned near a computing area when the cable guide is positioned within the key way. A cable for interconnecting computing areas within the first housing passes over a cable guide, through the opening in the corner post, into the hollow portion of the corner post, down or up the corner post and out of the opening in the corner post and over another cable guide.

The cable managment system of the computer system routes the cables around the front of the computer system. This lessens the congestion or the cable spillage out of the back of the computer system. The cable management system also eliminates cable conduits which typically add 50 percent to the diameter of the cable. There is also no need for separate cable clips or nylon cable ties. The bending radius is carefully controlled and the installation of the computer system and any subsequent upgrades are more uniform and not as dependent on the skill of the installer. In addition, one cable can be located easily and the cable is accessable. In other words, there is no unbundling of the cables in a cable tie and ripping off the cable conduit to effectuate a repair.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
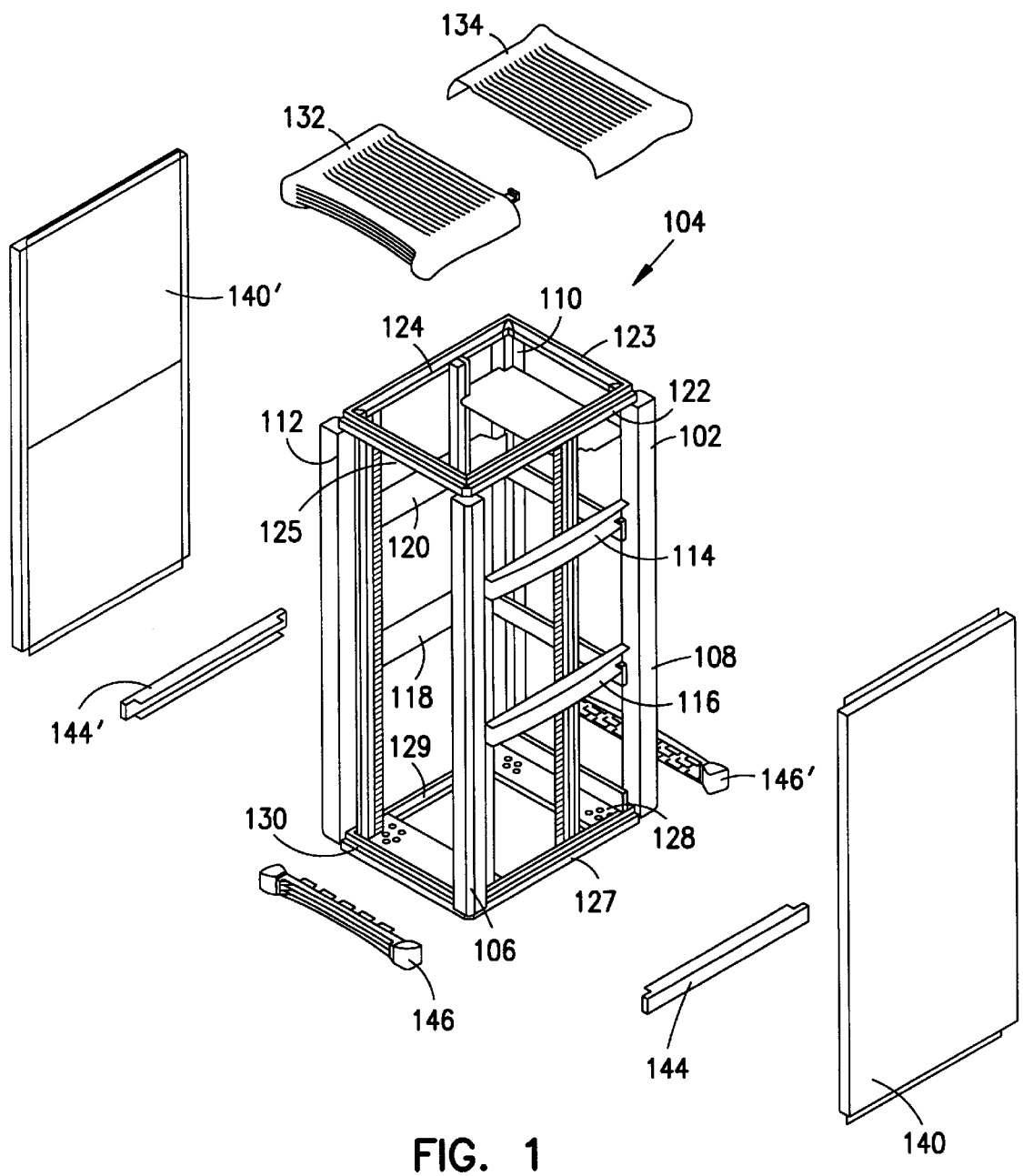
FIG. 1 is an exploded perspective view of the frame for a computer system.

FIG. 1 shows the frame 102 for a basic computer system 104. The frame 102 is comprised of four corner posts 106, 108, 110 and 112. The frame also includes cross members 114, 116, 118 and 120. The frame cross members are interposed between a pair of corner posts. The frame also includes upper cross members 122, 123, 124 and 125. The frame also includes lower frame cross members 127, 128, 129 and 130. A top which comes in two halves 132 and 134 fits on the upper frame members 122, 123, 124 and 125. The top includes louvers which allow air intake to cool the computer system 104. A side panel 140 fits between the corner post 106 and the corner post 108. Similarly, a side panel 140' fits between corner post 110 and corner post 112. Side panel 140 and side panel 140' are essentially identical. A pair of trim pieces 144 and 144' fit over the lower frame member 127 and 129, respectively. Another pair of trim pieces 146 and 146' fit over the lower frame cross member 130 and 128, respectively.

Side Panel Housing Members

Figure 2:
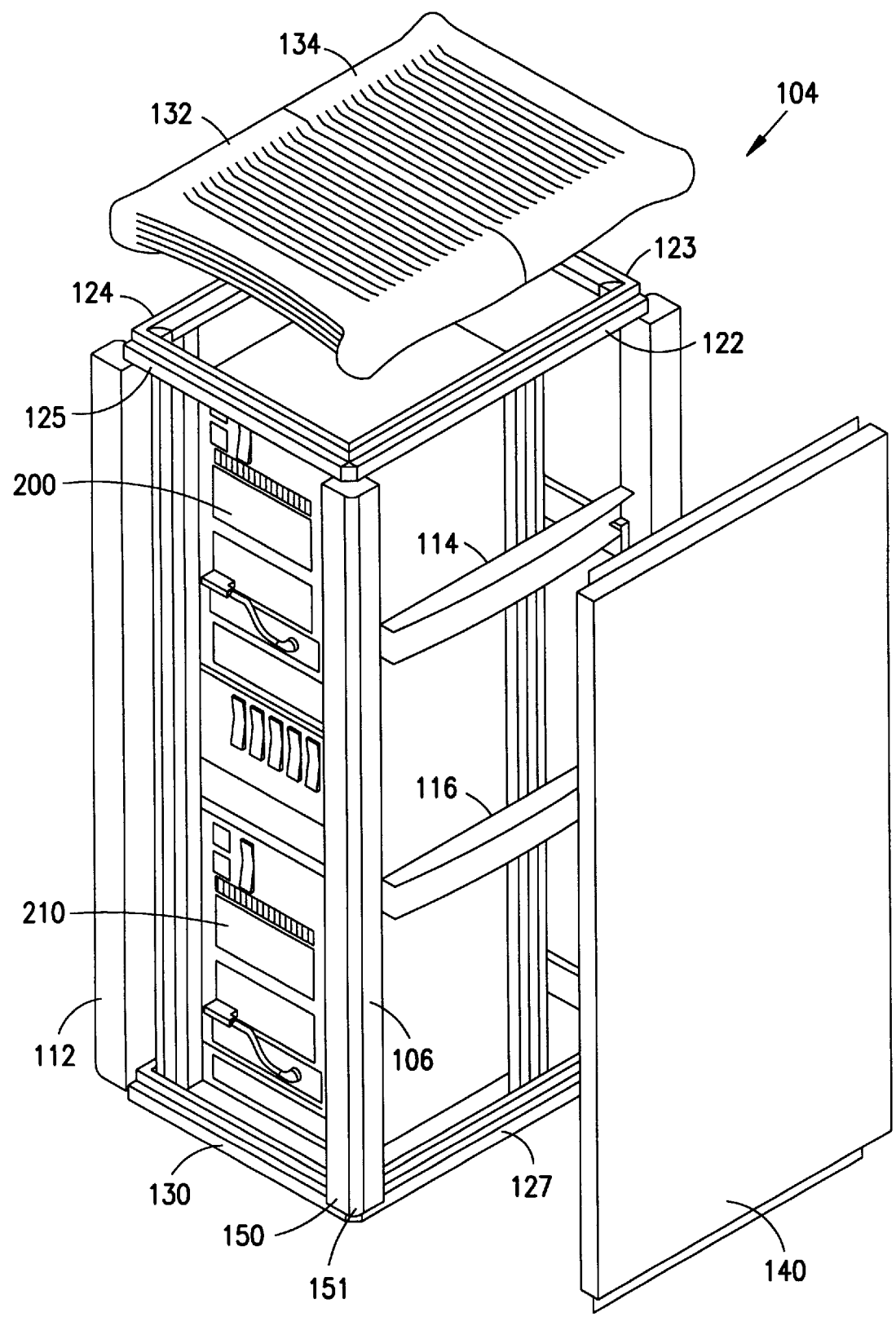
FIG. 2 is an exploded perspective view of the computer system which shows portions of the housing.

FIG. 2 shows the basic computer system 104 which now includes a computing unit 200 and a computing unit 210. In a finally assembled system, the computing unit 200 and computing unit 210 are connected with a pair of computer cables. The computer cables are not shown in FIG. 2. Computing unit 200 and computing unit 210 also have connectors for receiving the ends of the pair of cables. The computing unit 200 is also termed as one computing area and computing unit 210 is also termed a computing area.

Figure 3:
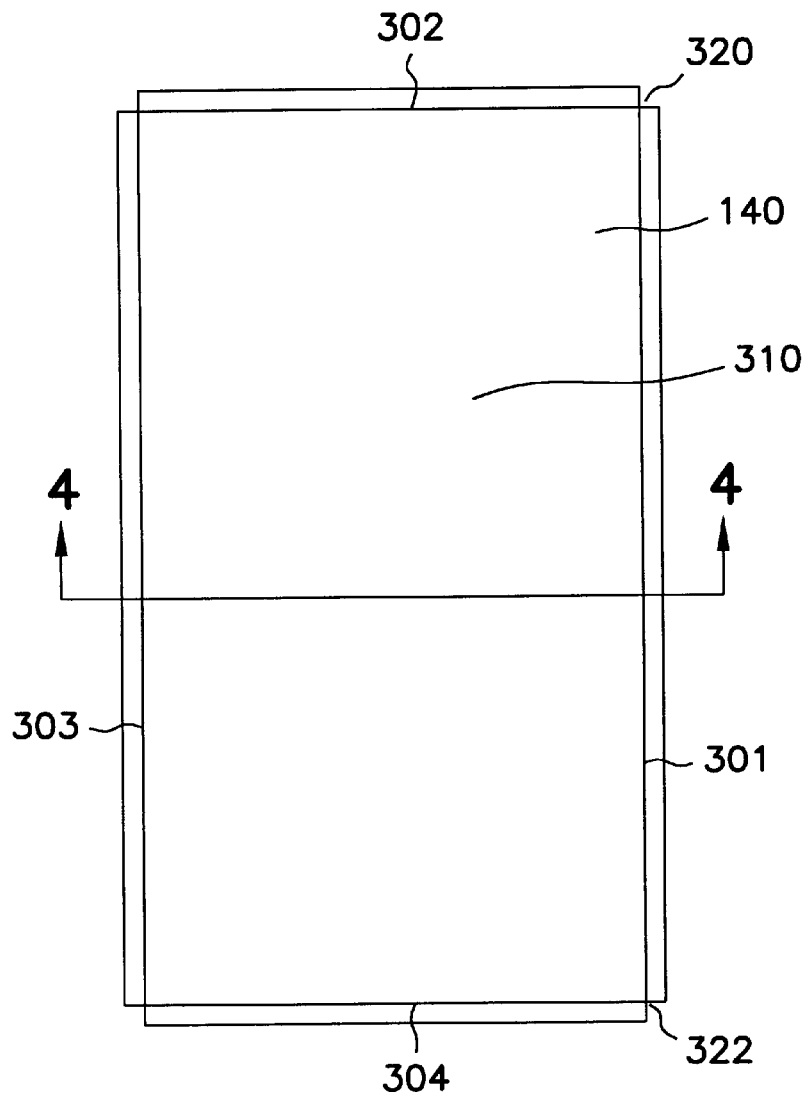
FIG. 3 is side view of one side panel of the housing of the computer system shown in FIG. 2.

Side panel 140 and its interconnection with frame corner posts 106 and 108 will now be discussed. FIG. 3 shows a top view of the panel 140. Panel 140 further comprises edges 301, 302, 303 and 304. The edges bound a main body portion 310 of the side panel 140. The corners of the panel 140 are relieved or have cutouts therein, such as corner 320 and 322. The reliefs allow the side wall to act like a small independent spring and allows the main body portion to behave as an independent giant elastic spring structure. The reliefs at the corners allow the side wall to act independently of the main body portion 310.

Figure 4:
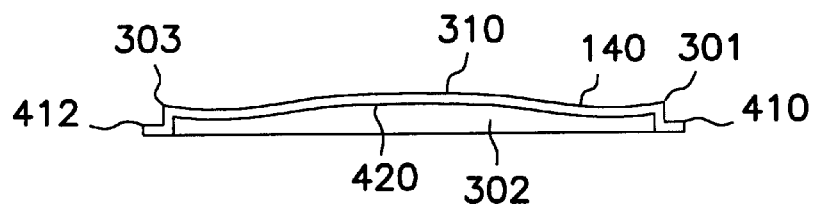
FIG. 4 is cross-sectional view of the side panel of the housing of the computer system along cutline 4—4 of FIG. 3.

FIG. 4 shows the side panel 140 in cross section as taken along cut line 44 from FIG. 3. As can be seen from this cross-sectional view, the main body 310 of the side panel 140 includes a curved surface 400. The curved surface 400 of the side panel 140 allows the side panel 140 to act as a spring when a compressive force is placed upon the edges of the side panel 301 and 303. In other words, when a compressive load is placed on the edges 301 and 303, the curved surface 400 can become slightly more curved and produce a force which is proportional to the amount of compression in the spring or curved surface 400. The main body 310 of the side panel 140 is made up of a resilient material such as formed ABS plastic. Each edge 301 and 303 includes a feature 410 and 412, respectively. In a preferred embodiment shown in FIG. 4, the edge 301 and feature 410 form an L shape. Similarly, edge 303 and feature 412 also form an L shape. In this particular embodiment, the features 410 and 412 are essentially flanges that run along the length of the respective edge of the side panel 140. Attached to the back of the panel 140 and between the edges 301 and 303 is a urethane foam sheet 420. The urethane foam 420 provides the side panel 140 with a more solid feel when bumped or tapped. The side panel is flexible when not positioned between a pair of corner posts. The side panel gains rigidity when installed between the corner posts.

Figure 5:
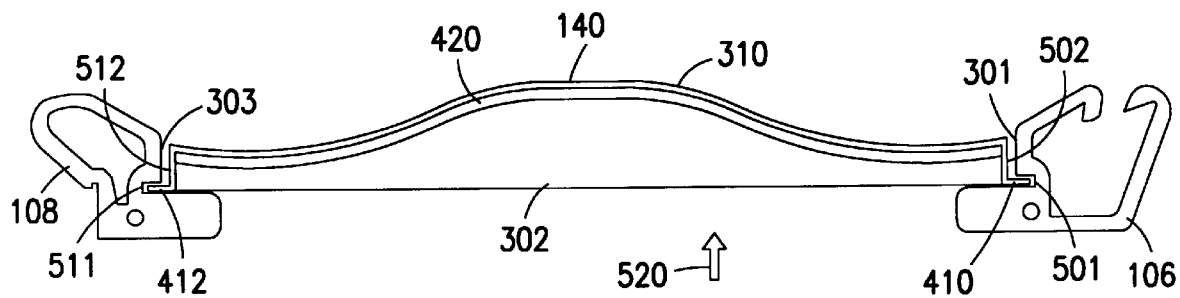
FIG. 5 is a cross-sectional view of the side panel of the housing engaged with a pair of corner posts of the computer system.

FIG. 5 shows a side panel 140 installed between the corner post 106 and the corner post 108. The corner post 106 includes a recess 501 which runs along a length of the corner post in this particular embodiment of the invention. The corner post 106 also has an abutment surface 502. Similarly, corner post 108 includes a recess 511 and an abutment surface 512. Of course, in FIG. 5, the side panel 140 is shown engaged with the corner posts 106 and 108. As engaged, the feature 410 fits within the recess 501 and the edge 301 abuts against the abutment surface 502. Similarly, for post 108, the feature 412 fits within the recess 511 and the edge 303 abuts against abutment surface 512. It should be noted at this juncture that the recess, such as 501, is shaped to receive the feature 410 and that the recess 511 is shaped to receive the feature 412. The features 410 and 412 are flanges along the edges of the side panel 140.

Figure 6:
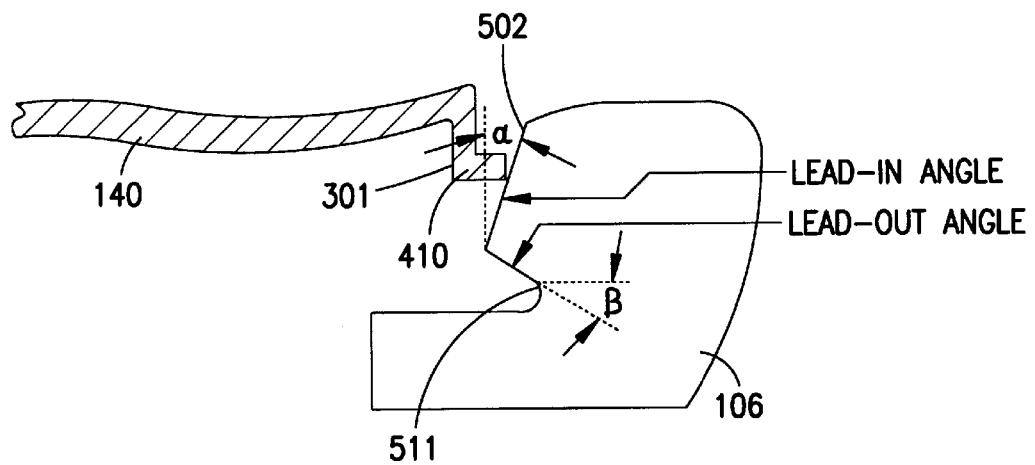
FIG. 6 is a cross-sectional top view of a corner post of the computer system.

FIG. 6 shows a top cross-sectional view of the corner post 106. The cross-sectional view of FIG. 6 includes a lead-in angle $\alpha$ associated with the abutment surface 502 and a lead-out angle $\beta$ associated with the recess 511. The angles in this cross section have been exaggerated to make a point. The lead-in angle $\alpha$ allows the edge 301 of the side panel 140 to fit between the posts 106 and 108. As the side panel 140 is further inserted between the posts, the feature 410 travels down the incline and progressively deflects edge 301 inwardly while it travels to the recess 511. The lead-in angle $\alpha$ provides for an easier installation of the side panel 140 between the posts 106 and 108.

FIG. 6 also shows an exaggerated lead-out angle β. The lead-out angle makes removal of the panel 140 easier since feature 410 rides over the inclined surface of the recess 511 during the removal process. Both angle α and angle β must be steep enough to allow easy movement of the panel but must not be too steep so as to inhibit movement of the side panel 140. The angle α is in the range of 5°–30°. The angle β is in the range of 20°–50°.

The features do not necessarily have to be flanges but could be any shape and still be within the scope of the invention. For example, the features 410 and 412 could be rounded at the ends or include a diamond-shaped end or even a square end. These are just a few examples of what could be used as features. It should also be noted that the feature as shown in FIG. 5 is shown at one end of the abutment surface 502, 512. The feature could occur in the middle of the edge 301 or 303 and the recess which mates with the feature or accommodates the feature could occur midway along the abutment surface 502, 512. Thus, the feature and the recess are not limited to a flange occurring at one end of the edge. The important thing is that the feature 410 or 412 aligns positionally with a recess on the post 106 or 108.

When the side panel 140 is installed between the posts 106 and 108, the edges 301 and 303 abut or contact the abutment surfaces 502 and 512, respectively. The curved surface of the main body portion 310 acts like a spring in that upon installation, it becomes somewhat compressed. By compressing the main body portion of the side panel 140, it is like compressing a spring in that by compressing it, a force is produced at the ends of the spring or at the edges 301 and 303 of the side panel 140. As a result, edge 301 not only touches abutment surface 502 on post 106, but there is a force applied by the curve in the main body 310 of the side panel which forces the edge 301 toward the abutment surface 502. Similarly, edge 303 is forced into the abutment surface 512 of post 108 by the spring force produced by the curve and the main body portion 310 of the side panel 140. This produces an advantage in that the features 410 and 412 of the edges 301 and 303, respectively, are not taking the total load of the side panel and holding it into place. Thus, the features 410 and 412 do not have to be as large and the edges 301 and 303 are taking on a portion of the load and a compressive force is placed on the posts 106 and 108 to hold the main body panel in position. The flanges or features 410 and 412 housed within their respective recesses 501 and 511 do not have to produce substantially all or the entire force which holds the body panel in place. Thus, the force necessary to hold the side panel 140 in place is spread over the edges and the abutment surfaces 502, 512 as well as into the recesses 501 and 511. The feature, such as 410 and 412, does not have to provide substantially all or the entire force which holds the side panel 140 onto the computer system. The strain on the features 410 and 412 is, therefore, minimized. Advantageously, the features 410 and 412 counteract a separating force which is depicted by arrow 520 in FIG. 5. The separating force tends to move the features out of their respective recesses and away from the posts 106 and 108 of the computer housing.

In the preferred embodiment shown in FIGS. 2-5, the side panel 140 is made of ABS plastic which is vacuum formed. After vacuum forming the side panel from the parent sheet, the remnants are typically trimmed. In this particular embodiment shown in FIGS. 2–5, the features 410 and 412 along the edges 301 and 303, as well as the other edges, are not trimmed all the way off and this gives rise to the particular features or a flange. Making the side panels 140 out of a plastic also provides a lightweight side panel for the computer housing. The urethane foam backing 420 gives the side panel 140 a more solid feel and a more solid sound if and when the side panel 140 is bumped or knocked. The plastic side panel 140 also has integral pigment and texture which can be provided by a collated thin film applied to the sheet prior to vacuum forming. The plastic side panel 140 can also be provided with an integral metal layer or metal fiber to help prevent problems with electromagnetic interference ("EMI"). The urethane foam backing can also have conductive characteristics to aid with EMI protection. A further advantage of the plastic sheet is that installation is very easy and intuitive. The plastic sheet is merely popped in between the frame members 106 and 108. More specifically, the side panel 140 is positioned between the posts 106 and 108 so that the features 410 and 412 are engaged with the abutment surfaces 502 and 512. One edge is merely pushed in until the particular feature associated with that edge, such as 501, engages the recess in the post 106. The same is done on the opposite side with feature 412 engaging recess 511. Once the feature 410 is engaged with the side abutment surface 502 of post 106 and the feature 412 is engaged with the abutment surface 512 of post 108, the panel can merely be pressed into place until the features engage their respective recesses. The plastic panel is also very easy to take out, since neither feature 410 or the feature 412 is excessively long and since there is a lead-out angle β. The panel can be bent slightly to relieve some of the force and then merely peeled off of the housing. It should be noted that once the panel is installed it gains rigidity provided by the frame. Cross frame members 114 and 116 have a curved form which conforms to back side of the panel to add rigidity and the foam backing absorbs tolerance differences. The ease of installing and taking out the panel provides for ease of manufacture as well as ease in upgrading the computer system. Upgrading a scalable computer usually includes adding computing units within additional frames. For example, the computer system shown in FIG. 2 can be upgraded to the computer system shown in FIG. 9 by adding three additional frames containing a total of 6 additional computing units. The plastic panel 140 allows for easy upgrades to the housing of the computer system. To upgrade a computer system, the panel 140 is merely removed and set aside. Another frame is positioned adjacent the initial frame which has frame members similar to those from which the panel was removed. The old panel is then reinstalled on the outside of the housing.

Figure 7:
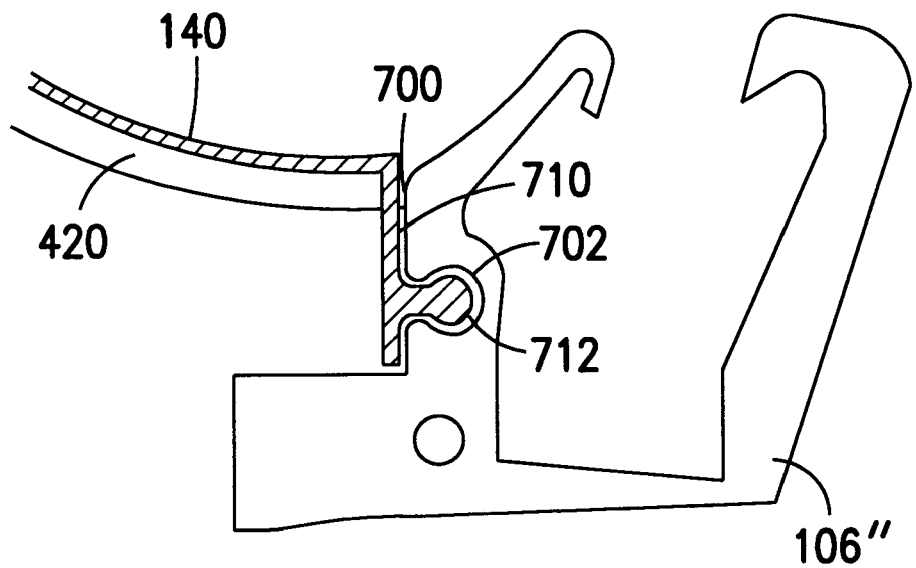
FIG. 7 is a cross-sectional view of another preferred embodiment of a side panel of the housing engaged with a corner post of the computer system.
Figure 8:
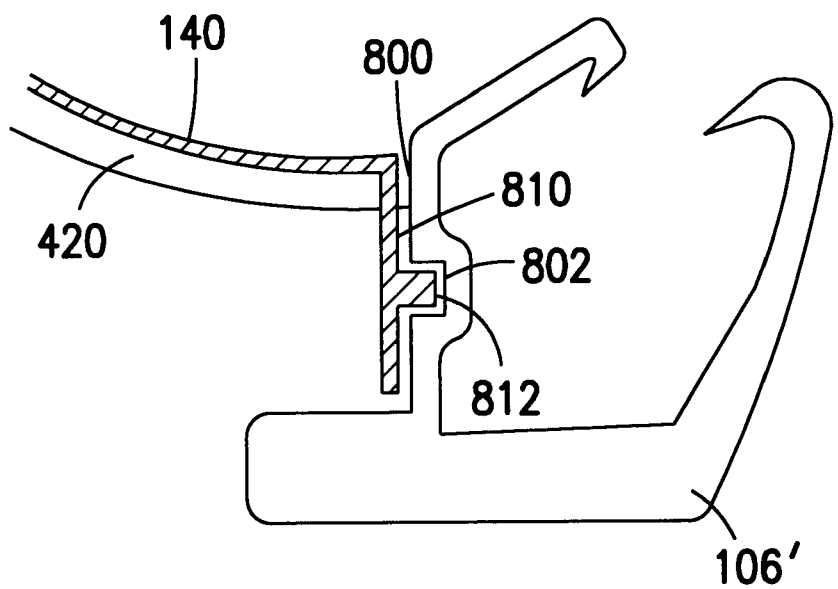
FIG. 8 is a cross-sectional view of another preferred embodiment of a side panel of the housing engaged with a corner post of the computer system.

The flange allows a spring finger of maximum length and practical use of vacuum forming process. However, the features do not necessarily have to be a flange as is shown in FIGS. 2–5. This is illustrated by FIGS. 7 and 8. FIGS. 7 and 8 feature posts 106' and 106". Corner posts 106' and 106" each include a recess that has a different shape and is located at a different position along the abutment wall or abutment surface. Now turning to FIG. 7, the corner post 106" includes an abutment surface 700 with a recess 702. The side panel 140 has an edge 710 which includes a feature 712 which fits into the recess 702. Now looking specifically at FIG. 8, the abutment wall 800 includes a recess 802 which occurs about midway between the ends of the abutment surface 800. The side panel 140 includes an edge 810 which has a square feature 812 which engages the recess 802 of the post 106'. Of import here is that the feature has a shape that corresponds to the shape of the recess and is located at approximately the same distance on the edge of the body panel so that it corresponds with the recess opening.

Cable Management

Figure 9:
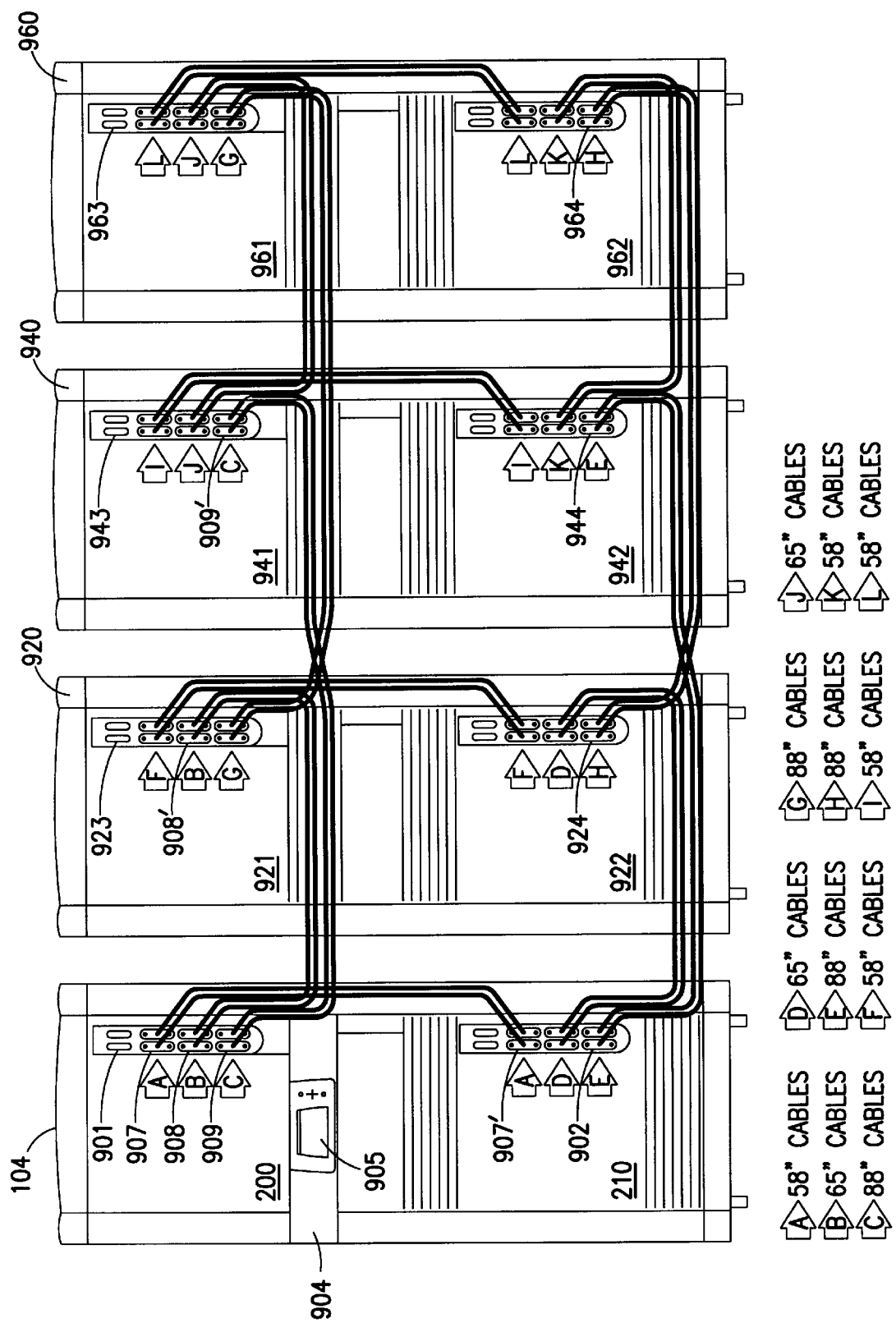
FIG. 9 is a scaled up computer system having a plurality of frames and shows the cable routing.

FIG. 9 shows a computer system that has been scaled up or expanded from the computer system shown in FIG. 2. The original computer system 104 is shown in FIG. 9. Computer system 104 includes computing unit 200 and computing unit 210. Computing unit 200 includes a set of connectors 901 and computing unit 210 has a set of connectors 902. The computer system 104 also includes a control panel 904 which includes a display 905. Computing system 104 can be thought of as having two computer areas or two computing areas which correspond to the areas occupied by computing unit 200 and computing unit 210. As the computer system is grown or is scaled upward, a new frame with one or more computing units is added to the original system 104. In FIG. 9, three new frames 920, 940 and 960 have been added to the original system. Each of the new frames includes two new computing units. Frame 920 now houses computing unit 921 and 922. Frame 940 includes computing area 941 and 942, and frame 960 includes computing unit 961 and 962. Each of the computing units includes a set of connectors. Computing unit 921 includes the set of connectors 923. Computing unit 922 includes connectors 924; computing unit 941 includes connectors 943; computing unit 942 includes connectors 944; computing unit 961 includes connectors 963; and computing unit 962 includes connectors 964. When the original computer system is scaled up or grown, it is necessary to make cable connections between the various computing areas or the various computing units. The cable connections are necessary to carry information including links to parallel processors between the various computing units. In this particular system, the computing units are input/output intensive. Roughly translated, this means that there are many cables emanating from the back side of the computer system and from each and every one of the separate computing areas. Such a system might be for use as a video server and provide videos to a number of subscribers or such a system might be a server connected to a large number of disk drives.

Since there is a potential to have so many cables emerging from the back of the computer system, the cables necessary to attach various computing units, such as 200, 210, 921, 922, 941, 942, 961 and 962, have been placed in the front of the computer to eliminate or lessen the congestion that occurs in the back of the computer due to the I/O-intensive nature of the computer system. As can be seen from FIG. 9, sometimes the cables have to make purely vertical runs such as the cables emanating from port 907 of computing unit 200 and going to port 907' of computing unit 210. Other cables have to be routed both vertically as well as horizontally, such as cables emanating from port 908 of computing unit 200 and traveling to port 908' of computing unit 921. This cable starts at 908 travels vertically down and then passes across from one frame to another, from the frame associated with the computer system 104 to the frame 920 and to the computing unit 921. Other cables such as those emanating from port 909 and terminating at 909' travel long horizontal distances across several frames such as 920 and 940 and also have a short vertical drop and a short vertical rise along its path.

The cables used to connect between various computing areas are approximately three-quarters of an inch thick and are shielded and have a minimum bending radius specified. The various cables cannot be bent with a smaller radius than the minimum bending radius. In order to pass the cables on the front of the computer as well as to live within the specifications of the bending radius, this computer has a cable management system. The cable management system is comprised of various combinations of three components which will be described in the paragraphs that follow. A post having a hollow core is used for vertical cable runs of all sorts. For horizontal cable runs, a comb is used and to convert a vertical cable run to a cable connection to a particular computing unit, a cable guide or bale is used. These will now be discussed in further detail.

Figure 10:
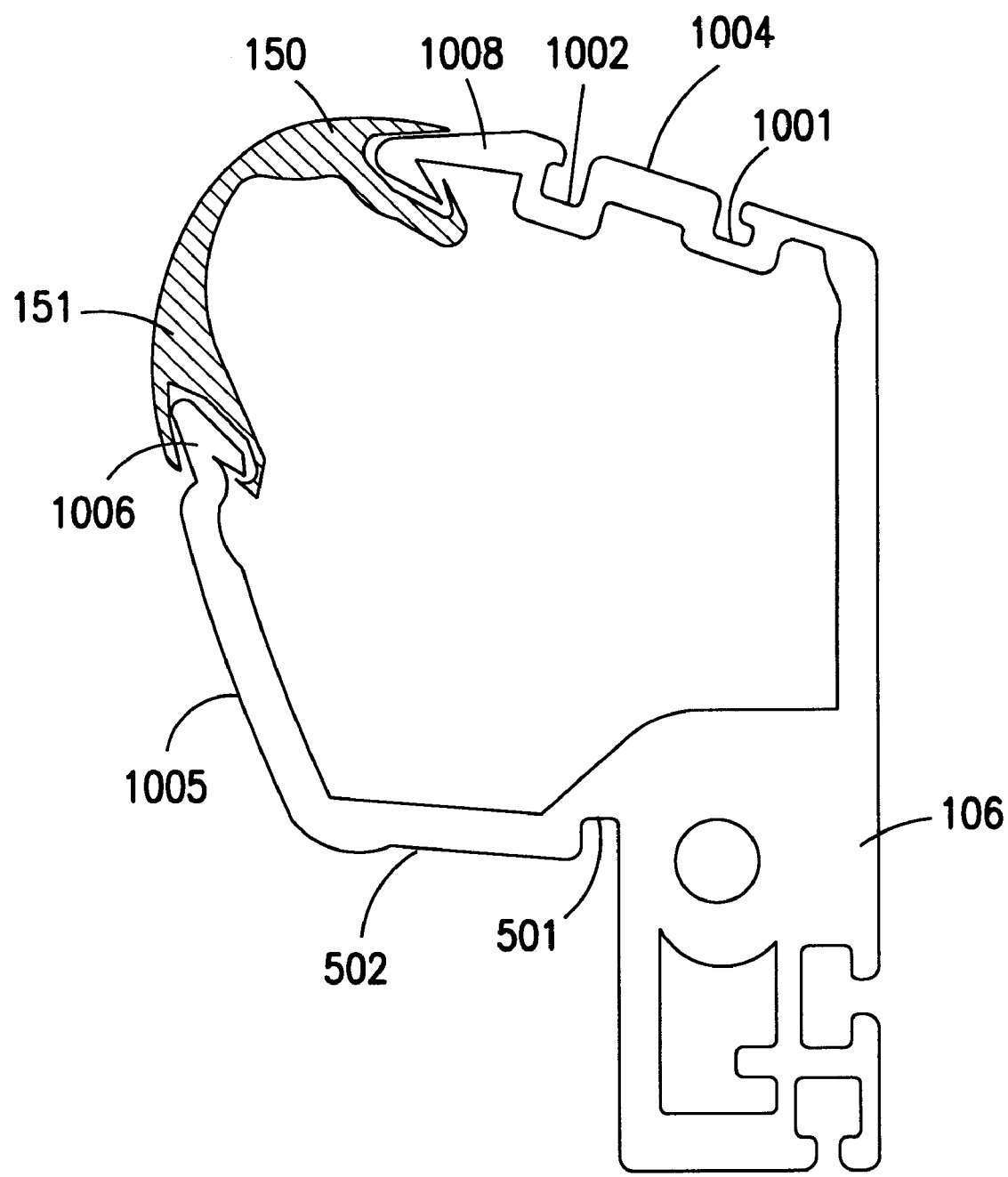
FIG. 10 is a cross-sectional view of the corner post of the computer system.

As can be seen in FIGS. 1 and 2, corner post 106 differs from the other corner posts 108, 110 and 112. As best shown in FIG. 2, the corner post 106 includes two flaps 150 and 151. The flaps 150 and 151 cover a slot within the corner post. This is best seen by turning to a cross-sectional view of the corner post shown in FIG. 10. Corner post 106 is C shaped in cross section. The C shape has several flattened sides including the abutment surface 502 and a surface having channel 1001 and another channel 1002. The external surface near the channels 1001 and 1002 is substantially planar. The substantially planar surface is labeled with the reference numeral 1004. The abutment surface 502 is adjoined to another slightly curved member 1005. Curved member 1005 has a free end 1006 which corresponds to the free end of a C. Free end 1006 includes a retaining member which is shown in FIG. 10 to be a barb. Member 1008 includes the channels 1001 and 1002 as well as the flat surface 1004. Member 1008 has a free end 1009 which is used to retain flap 150. In this particular embodiment, the end retainer is shaped like a barb. The flaps 150 and 151 include a first material for connecting to the flap-retaining surface 1009 and a second softer material which forms the remainder of the flap. Flap 151 is similarly constructed. Flaps 150 and 151 as attached to their respective barbs meet and form a curtain that covers the open slot in the cross-sectional area of the post 106. In operation, the hollow portion of the post 106 is used as a cable run or cable conduit. The flaps allow the cable to enter or exit and the flaps 150, 151 conform to the cable as it is going into or coming out of the cable run or cable conduit. It should be noted that each frame such as 920, 940 and 960 includes a similar corner post which is used as a vertical cable run.

Figure 11:
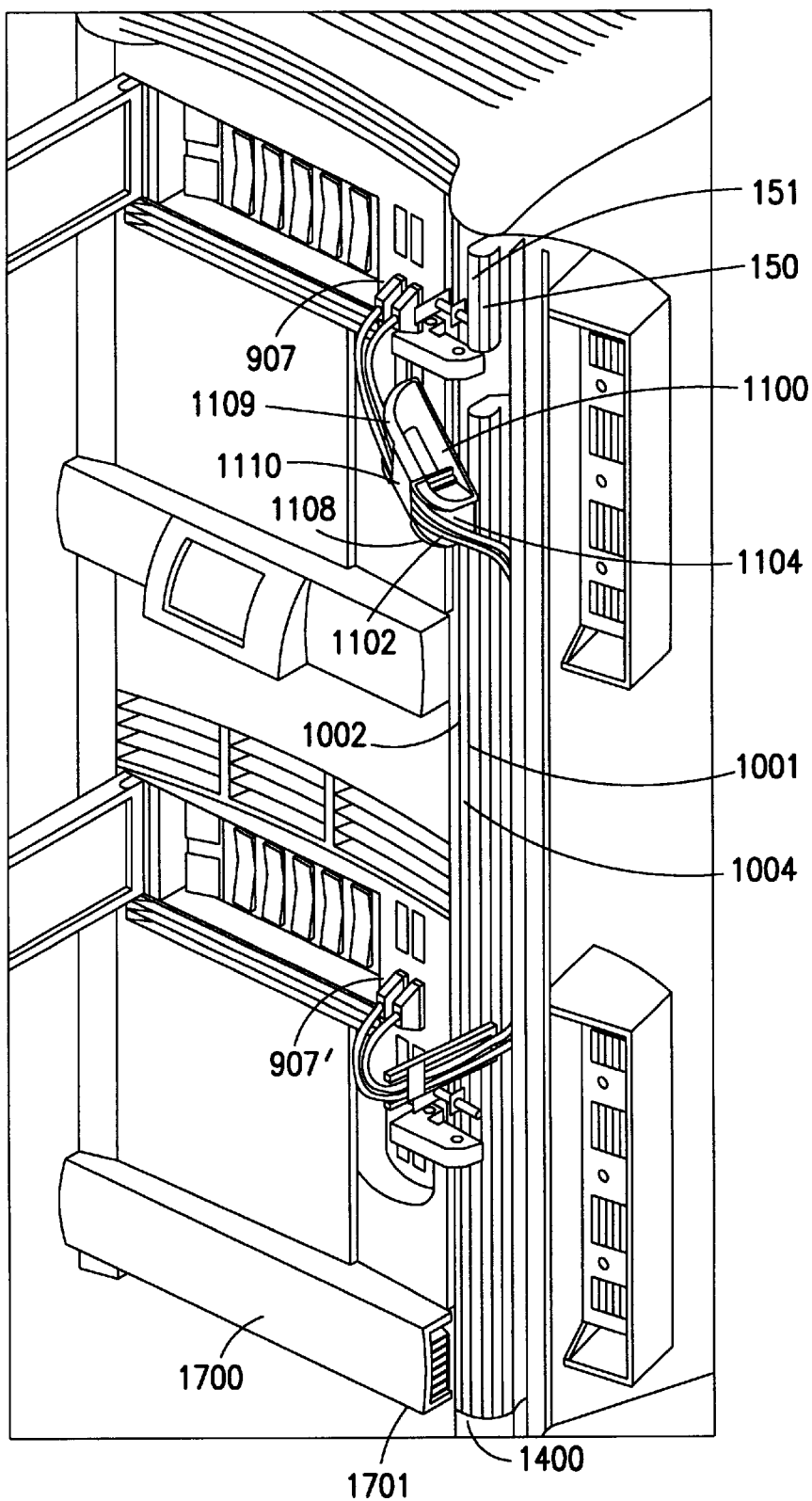
FIG. 11 is a partial perspective view of the cables, cable guide and corner post of one frame of the computer system.

The flaps 150 and 151 are made of a two dual hardness co-extruded thermoplastic elastomer strips. The harder plastic that fits over the barb 109 allows for zipperlock fastening of the flaps to each of the barbs. The flaps 150 and 151 cover the opening in the C-shaped cross section of the corner post 106. When a cable is leaving or entering the frame conduit or cable run, which is the hollow portion of the corner post 106, the flaps also support the cables as they leave or enter the corner post 106. FIG. 11 shows two cables as they are leaving the corner post 106. Flaps 150 and 151 are also shown in FIG. 11.

FIG. 11 also shows a cable guide 1100 as it is used in the cable management system. In FIG. 11 a pair of cables 1102 emerge from between the flaps 150 and 151 and pass over a rounded surface 1104 of the cable guide 1100. The cable guide 1100 is positioned so that as the cables leave the cable guide, they are near their termination point which in this case, is port 907 of the computing unit. The cable guide includes a pair of lips 1108 and 1109. The lips act to retain the cable on the cable guide. A clip 1110 also fits over the lips and this also retains the cable or pair of cables 1102 to the cable guide. The clip 1110 is at a height that is above the lips 1108 and 1109. Thus, the lips 1108 and 1109 serve as a standoff for the clip 1100. FIG. 11 also shows another cable guide 1150 which guides the cables form the cable run or hollow portion of the corner post 107 down ot a port 907' of a lower computing unit.

Figure 12:
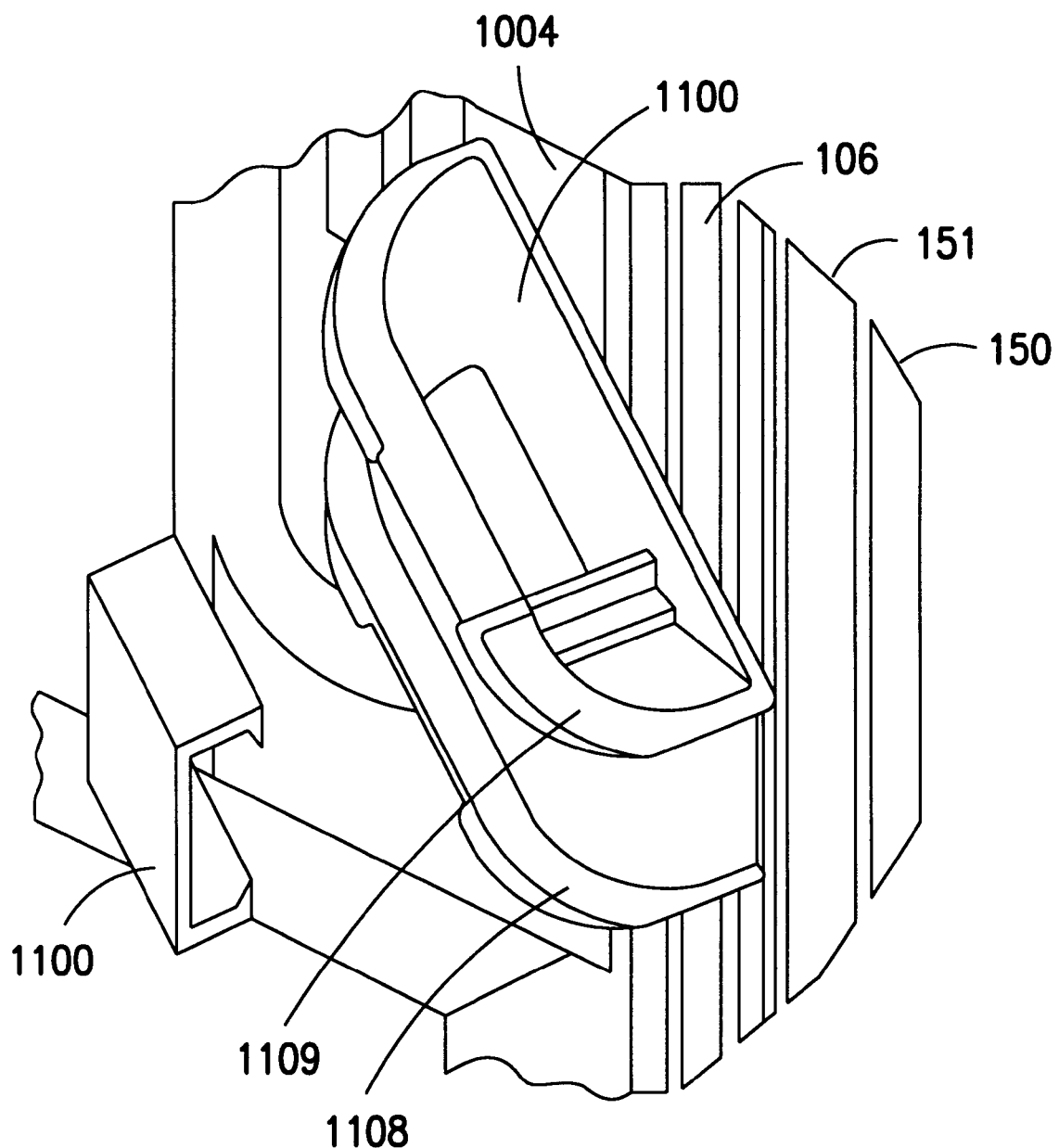
FIG. 12 is a perspective view of the cable guide attached to the corner post of one frame of the computer system.

Now turning to FIG. 12, we can see that the cable guide 1100 is attached to the corner post 106. The cable guide is attached to the corner post at the channels 1001, 1004 (shown in FIG. 11 and shown FIG. 10).

Figure 13:
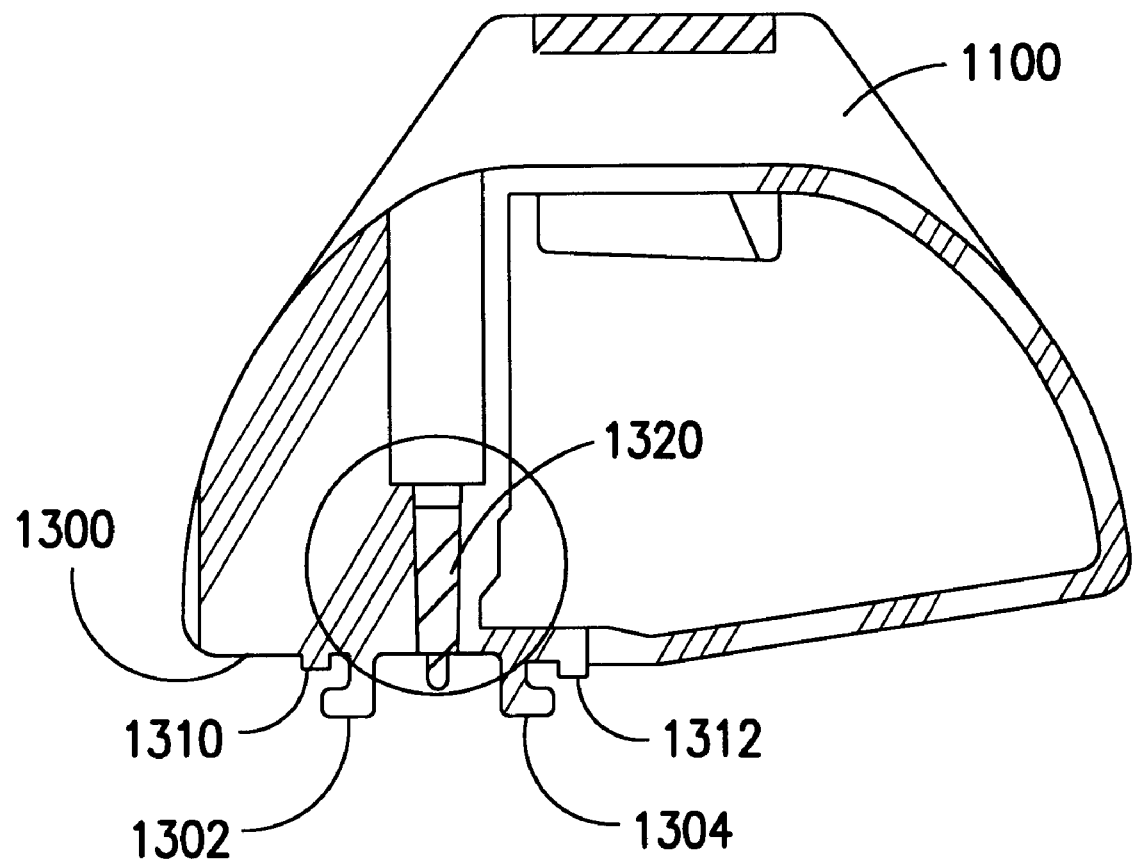
FIG. 13 is a cross-sectional view of the cable guide.

FIG. 13 shows a cross-sectional view of the cable guide 1100. The cable guide 1100 includes a surface 1300 which also includes a pair of square knobs 1310 and 1312 which engage surface 1004 of the corner post 106. As shown in the cross section, cable guide 1100 includes a first L-shaped leg 1302 or retaining means and a second L-shaped leg 1304 or retaining means. The L-shaped leg or retaining means 1302 engages the channel 1002 as shown in FIG. 10 while the L-shaped leg or retaining means 1304 engages the channel 1001 as shown in FIG. 10. The L-shaped retaining legs 1302 and 1304 are not the only design that would work to hold the cable guide 1100 to the corner post 106. Other means are also available and other shapes of channels and retaining legs are also contemplated as being within the scope of this invention. The cable guide 1100 also includes a mechanism for engaging a detente on the post or corner post 106. Detentes or small, shallow, hemispherical pockets are placed in the corner post 106 so that the cable guides may be positioned so that one end of the cable guide aligns near the port to which the cables are either coming from or going to, or to which it is connected. The cable guide includes a ball-plunger mechanism 1320 which engages the detentes on the corner post 1106. To install a cable guide, there is typically provided a relief in the corner post 106 at a level that is beyond the detentes in the corner post. In other words, there is a small opening or recess in the channel of sufficient length so that the retaining legs 1302 and 1304 of the cable guide can pass into the channel at that point. By inserting the legs 1302 and 1304 into the channel and then moving the cable guide 1100 away from the recess or opening, the retaining legs engage the channel walls.

The cable guide 1100 has a rounded shape that is actually helical. Advantageously, the cable guide is able to change directions of the cable from vertical to horizontal and also change the direction of the cable from coming out of the corner post to going into the port to which it is connected. The helical shape of the cable guide prevents the cable from bending in a vertical direction at a radius which is less than the minimum radius. The cable guide is also dimensioned so that the change of the cable from coming out of the corner post and going into the port is also greater than the required radius specified by the cable manufacturer. It should be pointed out that the minimum radius specified by the cable manufacturer is quite critical since going beyond the minimum radius or at a smaller radius may compromise the insulation on the cable. It should be noted that these cables are substantial. Each cable is three-quarters of an inch thick and has a sheathing to prevent electromagnetic interference. These cables are also carrying massive amounts of information at a rate of approximately 800 megabytes per second, so it is critical that the insulation not be compromised because to do so could also compromise the integrity of the whole computer system.

Figure 14:
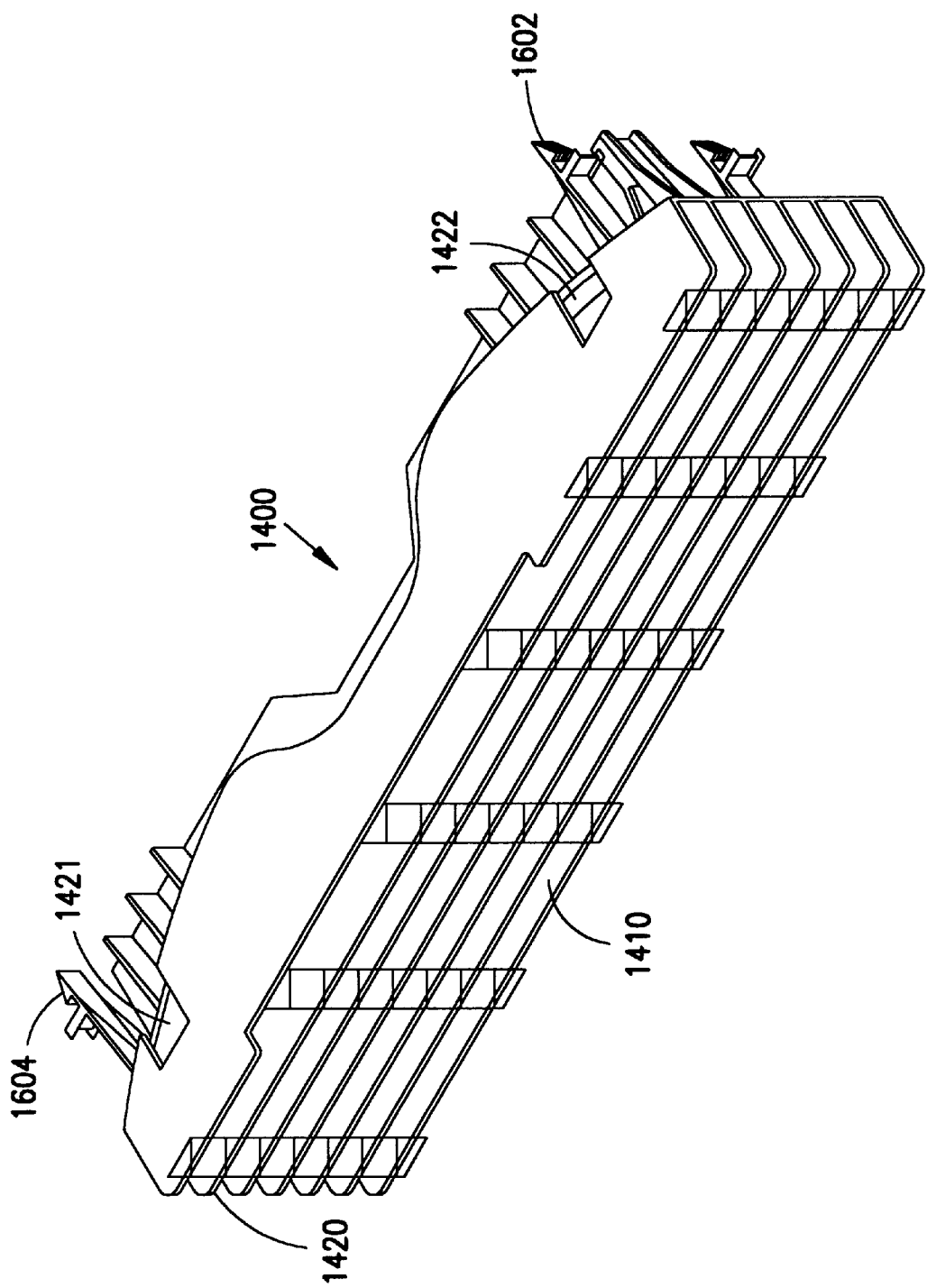
FIG. 14 is a perspective view of the cable comb of the computer system.
Figure 15:
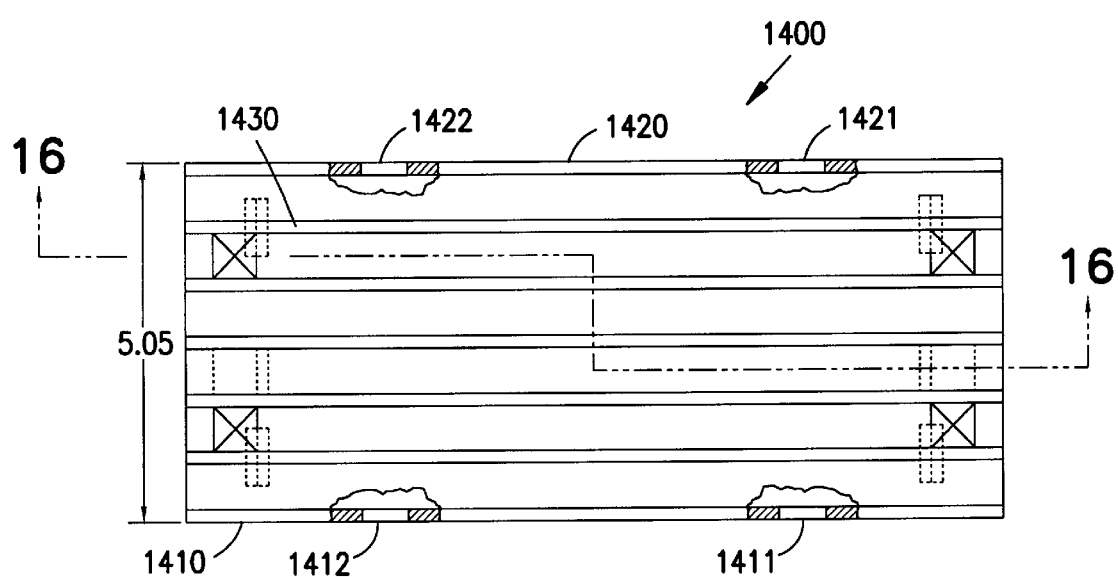
FIG. 15 is a front view of the cable comb of the computer system.
Figure 16:
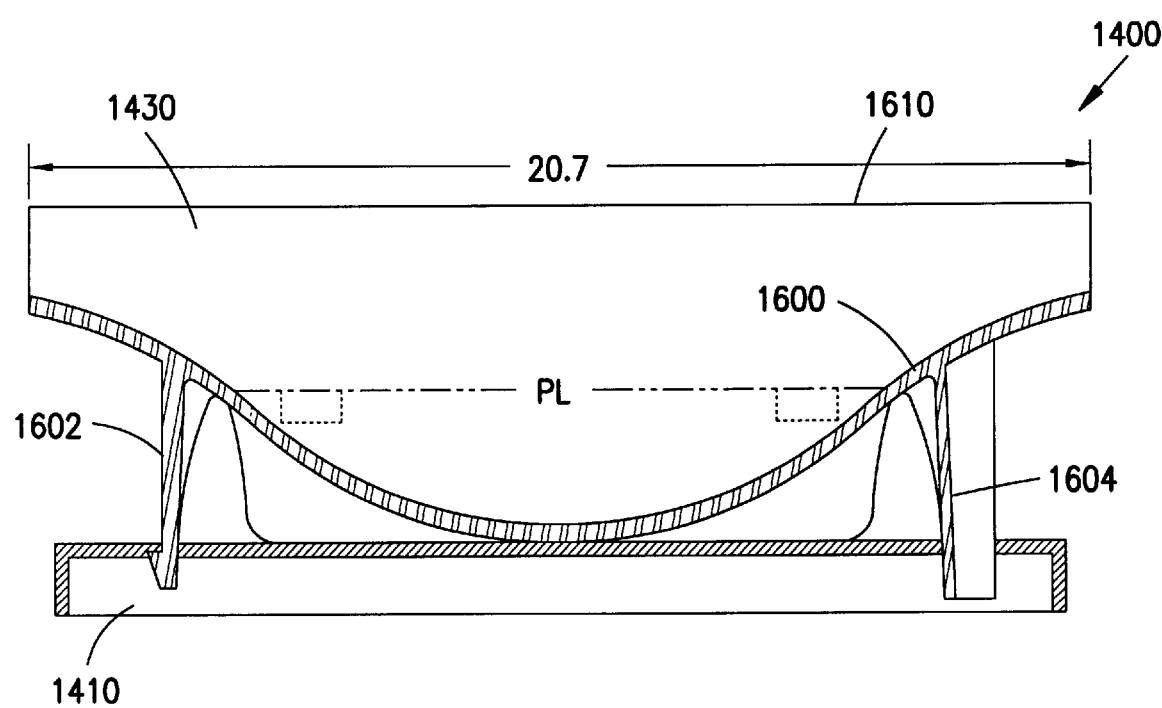
FIG. 16 is a cross-sectional view of the cable comb of the computer system.
Figure 17:
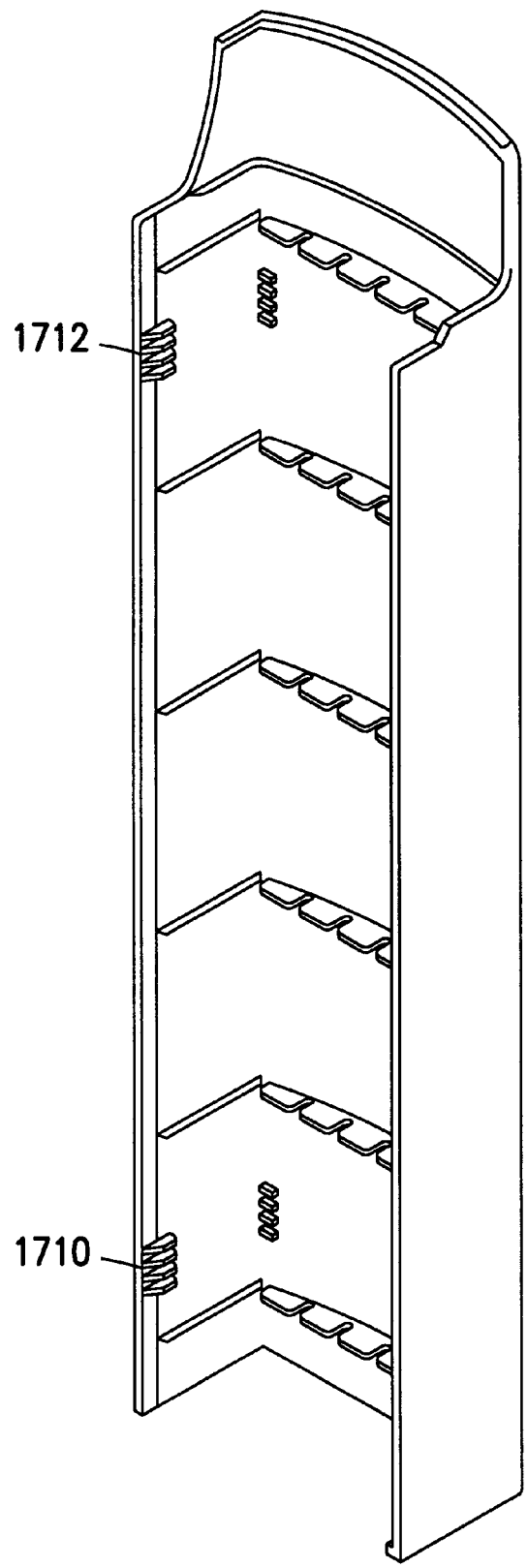
FIG. 17 is a perspective view of the cable comb cover of the computer system.

The cables also need to be supported during horizontal runs of the cables such as shown in FIG. 9 where cables are connected to port 909 on one end and port 909' on the other end. To support the cables during their horizontal runs, a device called a comb is used. A comb is associated with each of the frames which cables will cross. Now turning to FIG. 14, a comb 1400 is shown, which is carrying cables 1402. A cable comb is a container having a series of ledges for the cables. As shown in FIG. 14, the cable comb 1400 has a lower ledge 1410 and an upper ledge 1420 as well as several intermediate ledges. The cable comb 1400 is called a comb since the ledges are spaced and the structure does look somewhat like a common, ordinary hair comb. The back wall of the cable comb 1400 is curved. The curve is used to accommodate cable slack while controlling the minimum cable bend radius. The curved feature allows use of common cable lengths for different cable runs and minimizes the number of discrete cables required. Now turning to FIGS. 15 and 16, a front and side view of the cable comb 1400 is shown. The comb blades or individual ledges have a straight front. As shown in FIG. 15, the comb 1400 includes an upper ledge 1420 and a lower ledge 1410 as well as a plurality of intermediate ledges. The upper ledge 1420 includes a pair of openings 1421 and 1422 near the back wall of the cable comb 1400. Similarly, the lower ledge includes a pair of openings 1411 and 1412 near the back sidewall of the cable comb. FIG. 16 is a cross-sectional view of the cable comb 1400 shown in FIG. 15. FIG. 16 details the back sidewall 1600 of the cable comb 1400. An intermediate ledge is also shown in the cross-sectional view of FIG. 16. As can be seen in the cross-sectional view, the intermediate ledge 1430 has a flat portion. Attached to the back wall 1600 are features 1602 and 1604. These are an integral spring finger and alignment finger, respectively. There are four spring fingers and two alignment fingers integral to the comb. They engage the mounting plate 1650 shown in view. The features 1602 and 1604 fit within a mounting plate that is attached to the front face of the computer. The mounting plate 1650 on the frame of the computer is also an airflow plenum beneath the compute modules as shown in FIG. 2.

The final portion of the cable comb is a cover or a cable comb cover shown installed in FIG. 11. The cable comb cover is a C-shaped cover which covers the cable comb 1400. The cable comb cover 1700 has two ends. All cable comb covers have two ends which allow the cables to pass through both ends of the cable comb 1400. The cable comb cover includes a square boss 1710 and a square boss 1712. Thus, after the cables have been run through the cable combs and are sitting upon the various ledges as shown in FIG. 9, the cable comb cover can be merely snapped into place to both protect the cables and also make the outer exterior of the computer system look more esthetically pleasing.

Thus, when the cable run is made, it will pass from a connector over a cable guide 1100, secured by a cable clip 1108 and into a corner post 106, past a pair of flaps 150, 152. The cable can then, if it is making a horizontal run, it may go through a cable comb and be placed inside some ledges on the cable comb, such as ledge 1430 shown in FIGS. 16 and 15. When it comes out of the cable comb, goes back into another corner post, past a pair of similar flaps 150, 151, makes its vertical run up to a position near a second cable guide which is positioned so that it terminates at one end near the connectors that it is to be connected to.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising:
    a plurality of computing areas;
    a plurality of cables connecting the computing areas so that information can be moved from one computing area to another computing area;
    a first housing for the computer system, said first housing including a corner post having an elongated hollow portion and an opening therein along the length of the corner post to allow access to the hollow portion of the corner post, said elongated hollow corner post further comprising a surface having a key way therein; and a plurality of cable guides, each cable guide having a key that fits within the key way of said elongated corner post, each cable guide having a two ends, one of said ends positioned near the opening in the corner post and the other end of said cable guide is positioned near a computing area when the key of said cable guide is positioned within the key way, wherein a cable for interconnecting computing areas within the first housing passes over a cable guide, through the opening in the corner post, into the hollow portion of the corner post, out of the opening in the corner post and over another cable guide.

2. The computer system of claim 1 wherein the cable guide has a rounded shape between the two ends.

3. The computer system of claim 2 wherein said plurality of cables have minimum specified bending radii associated therewith and wherein rounded shape of the cable guide has a radius greater than the minimum specified bending radius of the cable.

4. The computer system of claim 3 wherein the cable guide has a helical shape.

5. The computer system of claim 3 wherein the corner post further comprises a barb positioned along the opening in the corner post, said computer system further comprising a flap having a portion which receives said barb to attach said flap along the opening in the corner post.

6. The computer system of claim 3 wherein the corner post further comprises:

a first barb positioned along one side of the opening in the corner post;

a second barb positioned along the other side of the opening in the corner post;

a first flap having a portion which receives said first barb to attach said flap along the one side of the opening in the corner post; and a second flap having a portion which receives said second barb to attach said flap along the other side of the opening in the corner post.

7. The computer system of claim 2 wherein the cable guide attached to the corner post, the surface of the corner post includes a key way therein, said cable guide further including a mechanism for engaging said key way so that the end of the cable guide near the computing area is positioned near a portion of connecter within the computing area.

8. The computer system of claim 1 wherein the cable guide further includes a clip which attaches between each edge of the cable guide to retain the cable as it passes over the cable guide.

9. The computer system of claim 1 wherein the cable guide further includes a lip on each edge for retaining the cable as it passes over the cable guide.

10. The computer system of claim 6 wherein the cable guide further includes a clip which attaches between each lip of the cable guide to retain the cable as it passes over the cable guide.

11. The computer system of claim 1 wherein elongated hollow corner post further comprises a flap attached along the opening therein along the length of the corner post.

12. The computer system of claim 1 further comprising:

a second housing for the computer system, said second housing including an elongated hollow corner post having an opening therein along the length of the corner post to allow access to the hollow portion of the corner post, said elongated hollow corner post further comprising a key way therein, said second housing also including a computing area; and a cable carrying structure shaped like a comb, said cable carrying structure further including a set of blades which divide the cable carrying structure into a plurality of cable carrying compartments, wherein a cable interconnecting a computing area of said first housing and a computing area of said second housing also passing through a cable carrying compartment of said cable carrying structure.

13. The computer system of claim 12 wherein the cable carrying structure has a curved wall portion.

14. The computer system of claim 13 wherein the cable carrying structure further includes a cover, said cover covering the blades of the cable carrying structure.

15. The computer system of claim 12 wherein the cable carrying structure has a wall portion having a sinusoidal shape, said wall portion traversing the blades of the cable carrying structure.

16. A component for managing cables in a computer system so that the cables are not subjected to a bend radius less than a specified bend radius, said component comprising:

a rounded surface having a pair of outside edges, said rounded surface for carrying cables, said rounded surface dimensioned so that the cables bend at a radius less than a specified minimum bend radius, wherein the rounded surface is helically shaped so as to move the cable passing over the helically shaped surface horizontally and vertically; and a cable clip which attaches to said component and passes over said rounded surface and a cable of a computer system.

17. The component for managing cables in a computer system of claim 16 further comprising a flat surface which includes an attachment mechanism for attaching the component to the computer.

* * * * *